July 28, 1953  J. A. HERBST  2,647,237
THERMOCOUPLE TESTING SYSTEM
Filed Nov. 17, 1950  2 Sheets-Sheet 2

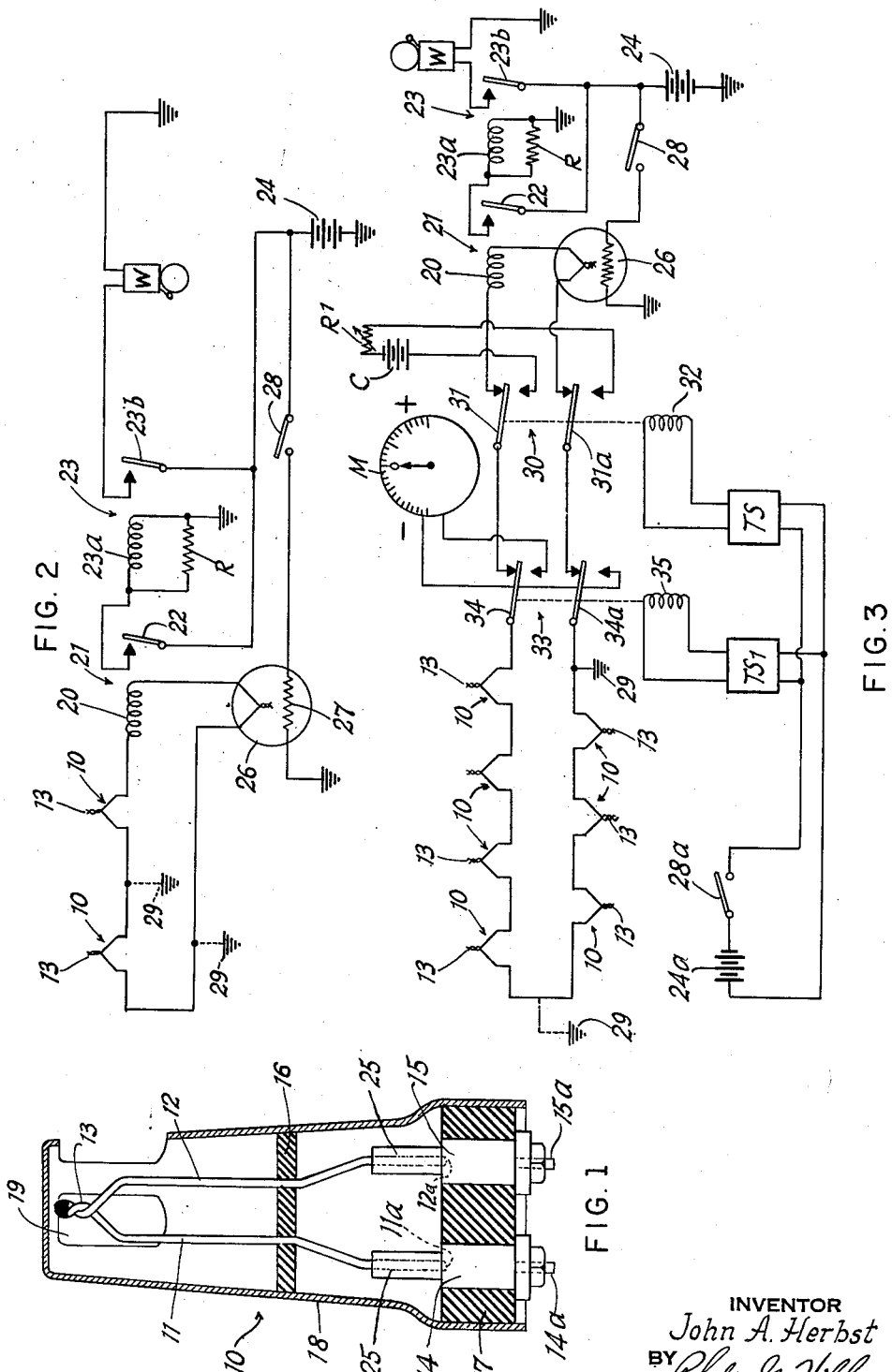

INVENTOR
John A. Herbst
BY
Philip G. Hilbert
ATTORNEY

Patented July 28, 1953

2,647,237

UNITED STATES PATENT OFFICE 2,647,237

THERMOCOUPLE TESTING SYSTEM

John A. Herbst, Pines Lake, N. J., assignor, by mesne assignments, to Bogue Electric Manufacturing Co., Paterson, N. J.

Application November 17, 1950, Serial No. 196,122

6 Claims. (Cl. 324—158)

This invention relates to a system for testing thermocouples used for detecting sudden rises in temperature. More particularly, the invention concerns means for testing thermocouples which create a voltage in response to a sudden rise in temperature such as may be caused by a fire, an overheated bearing, or the like.

In order to detect a sudden rise in temperature due to abnormal temperatures in a selected zone such as in an airplane engine compartment, machine bearing, or the like, there has been provided a warning system based on the use of one or more thermocouples located in the selected zones. Each thermocouple comprises a hot junction and heat insulated reference junctions, the thermocouples being series connected with an electrically operated warning device, whereby a rapid rise in temperature in one or more zones will be effective in respect to the thermocouple junctions in such zones, to generate a current which operates the warning means.

It is important that such systems be adapted to be quickly tested at periodic intervals, in order to make sure that the system is in good working order. Test means has been provided which can indicate any discontinuity in the circuits interconnecting the thermocouples and the warning means. However, such known test means will not indicate the presence of a short circuited thermocouple, false grounds which may render one or more thermocouples inoperative, or reversed polarity of connections. With the highly sensitive polarized relays used in such systems to operate the warning means in response to the current generated by the thermocouples, reversed polarity of connections on a thermocouple will render the system inoperative when such thermocouple is subjected to a rapid rise in temperature, since the continuity test is ineffective to indicate incorrect polarity of thermocouple connections.

In addition, an incorrectly connected thermocouple may render a correctly connected thermocouple ineffective, since if both thermocouples are subjected to a rapid rise in temperature, the voltage generated by the incorrectly connected thermocouple will be in opposition to that of the correctly connected thermocouple, leaving the resultant voltage substantially zero and ineffective to operate the relay.

Accordingly, an object of this invention is to provide in a thermocouple system of the type described, a test circuit adapted to be connected to the system for determining the presence of one or more shorted or incorrectly connected thermocouples, or false grounds in the system.

Another object of this invention is to provide in a system of the character described, a test circuit including means for heating the hot and reference junctions of the thermocouples by passing a current therethrough, the hot junctions being heated more rapidly than the reference junctions, thereby generating an E. M. F. proportional to the difference in temperature, and means for indicating the cumulative value of the individual voltages of the thermocouples in accordance with their respective directions in the circuit, whereby to detect the presence of one or more short circuited or incorrectly connected thermocouples.

A further object of this invention is to provide in a system of the character described, a test circuit including means for passing a current through the junctions of the interconnected thermocouples, the insulated and non-insulated junctions thereafter cooling at different rates to thereby generate individual voltages, and means for indicating the cumulative value of such voltages in accordance with their respective directions in the circuit, whereby to detect the presence of one or more short circuited or incorrectly connected thermocouples.

Still another object of this invention is to provide in a rapid temperature rise detection system including a group of thermocouples, a test circuit including a second group of thermocouples equal in number and design to the thermocouples of the first group, but connected with reversed polarities as compared to the polarity connections of the first group, together with means for passing a current through the junctions of both groups of thermocouples whereby to generate E. M. F.'s in each of the thermocouples of both groups, and means for indicating the algebraic sum of generated E. M. F.'s in both groups of thermocouples, whereby to detect one or more incorrectly connected or shorted thermocouples in the first group, the generated E. M. F.'s being created by a differential heating or cooling effect as between the hot and reference junctions of each thermocouple.

Still a further object of this invention is to provide for use with a system of the character described, simple test circuits having a minimum number of components which are readily interconnected, which are quickly operable to check the system and which are rugged, compact and efficient to a high degree in use.

Other objects of this invention will in part be obvious and in part hereinafter pointed out.

The invention accordingly consists in the combinations of elements and circuit connections therefor, which will be exemplified in the circuits hereinafter described, and of which the scope of application will be indicated in the following claims:

In the accompanying drawings:

Fig. 1 is an elevational view of a conventional thermocouple forming part of the system, with parts in section;

Fig. 2 is a diagrammatic representation of a conventional test circuit for a plurality of interconnected thermocouples;

Fig. 3 is a diagrammatic representation similar to that of Fig. 2, together with a test circuit embodying the invention;

Figure 4:
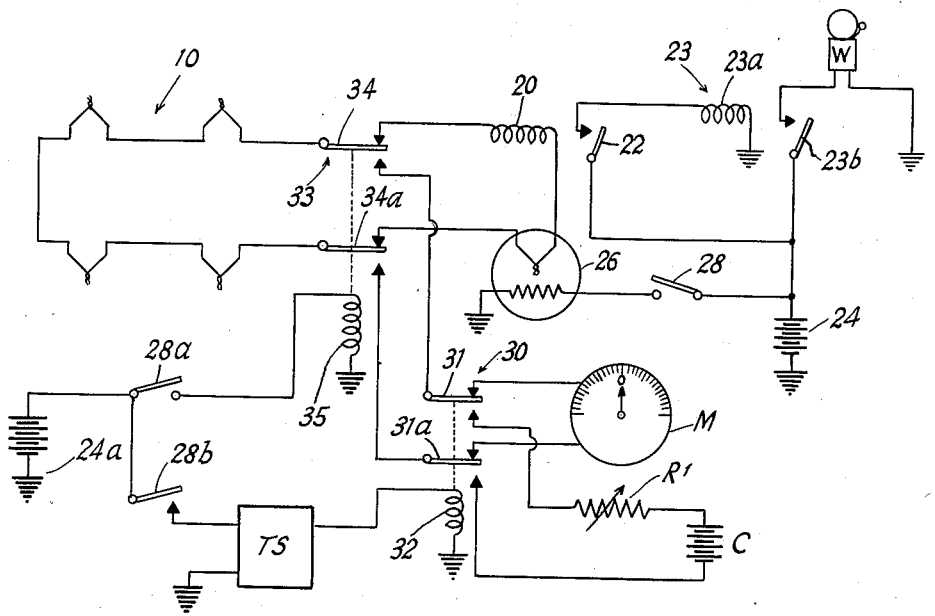
Figs. 4 and 5 show modified forms of the test circuits embodying the invention.

In Fig. 1, 10 designates a conventional thermocouple known in the art. The same comprises a pair of wires 11, 12, of dissimilar metals and having their outer ends twisted and welded together as at 13, forming what is known as a hot junction. The inner ends of the wires 11, 12 are welded to short metal elements 14, 15, respectively, as at 11a, 12a, forming what are known as cold or reference junctions. The elements 14, 15 are formed of the same metal, which may be of stainless steel or the like, and terminate in reduced, threaded portions 14a, 15a, which provide terminals for electrical connections.

The assembly of wires 11, 12 and metal elements 14, 15 is mounted in spaced electrical and heat insulating members 16, 17. The members 16, 17 are fixed within the interior of a metal cage 18 which is formed with a plurality of openings 19 at the upper end thereof. The hot junction 13 is located opposite openings 19 so as to be freely accessible to the atmosphere. The metal elements 14, 15, which are of much greater diameter than wires 11, 12, together with junctions 11a, 12a are disposed within insulating member 17.

Each of the thermocouples 10 is adapted to be located in a selected zone which may be subjected to a rapid rise in temperature. Such zones may be various portions of an airplane engine compartment, baggage or cargo compartment, electrical and hydraulic accessory compartments, a machine bearing, various portions of a structure subject to fire hazards, or the like.

The thermocouples 10 are series connected as shown in Fig. 2, and are further connected in series with the coil 20 of a sensitive, polarized relay 21. The armature 22 of relay 21 is adapted to close a circuit through a relay 23, in response to energization of coil 20. The relay 23, in turn is adapted, upon energization of the coil 23a thereof, through a current source 24, to have its armature 23b close a circuit to operate an electrical warning device W, which may take the form of a bell, a signal light, or the like. The coil 23a is shunted by a resistance R to prevent sparking at the contact points of the relay.

The current for energizing coil 20 is derived from one or more thermocouples 10 when such thermocouples are exposed to a rapid rise in temperature. As shown in Fig. 1, the reference junctions 11a, 12a are heat insulated, but a slow rise in temperature in the vicinity of the thermocouples, as when a motor warms up or a gradual change in ambient temperature takes place, will effect the hot and reference junctions substantially equally.

However, a rapid rise of temperature, due to a fire, overheated bearing or the like, will cause the hot junction 13 to heat up much more rapidly than the reference junctions 11a, 12a. The lag in heating is accentuated by heat insulating sleeves 25 on the lower portions of wires 11, 12 and the relative difference in the mass of elements 14, 15 and wires 11, 12.

Accordingly, a rapid rise in temperature will produce a differential heating effect as between the hot and reference junctions of the thermocouple or thermocouples exposed to such temperature rise, and there will be created a voltage at terminals 14a, 15a which is proportional to the rate of rise of the ambient temperature. The more rapid the change in temperature, the greater will be the temperature differential between the hot junction and the reference junctions and the higher the output of voltage at terminals 14a, 15a.

The current output of one or more thermocouples is adapted to energize the coil of the sensitive relay 21. The operation of relay 21 is effective to close the circuit between the warning signal W and the source of current 24, through the relay 23, thus operating the warning signal.

In order to test the continuity of the circuits in the system shown in Fig. 2, there has been provided a test circuit which includes an enclosed thermocouple 26 having a resistance heater 27 located adjacent the hot junction thereof. The heater 27 is connected in circuit with the source of current 24 through a normally open button switch 28. To test the circuit, switch 28 is closed so as to heat the resistance 27, thereby furnishing heat sufficient to cause thermocouple 26 to generate a current. If the circuit connections are continuous and unbroken, the generated current will be effective to operate relay 21 and thereby operate relay 23 and the warning signal W.

Such a test circuit, however, will not detect thermocouples having improper polarity connections. A thermocouple having its terminals 14a, 15a improperly connected in the series circuit, will not operate the polarized relay 21, even though subjected to a rapid rise in temperature. An incorrectly connected thermocouple may also fail to operate a non-polarized relay inasmuch as such a thermocouple upon exposure to a rapid rise in temperature may create a current substantially equal to the current created by one or more correctly connected thermocouples also subjected to a rapid rise in temperature, the resultant current being either zero or insufficient to operate the non-polarized relay.

Furthermore, the test circuit shown in Fig. 2, will not detect a short circuited thermocouple or false grounds such as indicated in dotted lines at 29, in the figure. In either case, a rapid rise in temperature will not be detected and the warning signal W will not be operated.

Accordingly, there is provided a test circuit embodying the invention, as shown in Fig. 3. Such circuit is adapted to measure the rate of rise in temperature by indicating the cumulative value of the E. M. F.'s generated by each of the thermocouples, and thereby indicate the presence of one or more thermocouples having reversed connections, one or more shorted thermocouples or false grounds.

Such a circuit includes means for passing a current through the junctions of each of the interconnected thermocouples whereby to heat the same, allowing the junctions to cool and measuring the currents created by the differential cooling effect as between the exposed hot junction and insulated reference junctions of each of the thermocouples.

Accordingly, as shown in Fig. 3, in a circuit entirely similar to that shown in Fig. 2, there is provided a current source C which is regulated by means of a rheostat R₁. The current source C is adapted to be connected in circuit with the thermocouples 10 by means of a double pole, double throw switch 30. The movable arms 31, 31a of switch 30 are in the form of armatures of a relay 32 which is adapted to be energized by a source of current 24a. A button switch 28a and a timer switch TS are interposed in the relay circuit. As shown in Fig. 3, the switch 30 normally disconnects current source C from the thermocouples 10.

The test circuit embodying the invention further comprises a millivolt meter M which is adapted to be connected in circuit with the hot and reference junctions of the interconnected thermocouples 10 by means of a double pole, double throw switch 33. The movable arms 34, 34a of switch 33 are in the form of armatures of a relay 35 which is adapted to be energized by source of current 24a upon operation of a timer switch TS₁. As shown in Fig. 3, the switch 33 normally disconnects the meter M from the thermocouples 10.

Assuming that it is desired to test the thermocouples 10 for reversed polarity of connection, short circuit or false grounds, switch 28a is closed. Timer switch TS is adapted to be closed for a predetermined time interval during which the relay 32 is energized to operate switch 30 and allow current from source C to flow through the thermocouples and thereby directly heat the hot and reference junctions of each thermocouple. After current ceases to flow, due to operation of the timer switch TS, the junctions will start to cool. However, with the hot junctions 13 exposed and the reference junctions 11a, 12a heat insulated, there will be a differential cooling effect whereby an E. M. F will be produced at the terminals 14a, 15a of each thermocouple.

Upon the lapse of a predetermined time interval after the timer switch TS disconnects the source of current C from the thermocouples and during which the differential cooling effect noted above, takes place, the timer switch TS₁ is effective to connect the meter M to the thermocouples through operation of relay 35, switch 28a being closed. The cumulative or algebraic sum of the E. M. F.'s produced by the several thermocouples will be indicated on the meter M.

In the event that one or more of the thermocouples 10 has its terminals 14a, 15a, reversely connected in the series circuit, then the E. M. F. of such thermocouple or thermocouples will be offset against the E. M. F. produced by the correctly connected thermocouples. Thus, assuming that each of the seven thermocouples shown in Fig. 3 supplies approximately 1 millivolt due to the differential cooling effect, then if all the thermocouples are correctly connected, there should be a reading of approximately 7 millivolts on meter M. If one thermocouple is reversely connected, then its voltage will neutralize the voltage of one correctly connected thermocouple, thus reducing the reading to approximately 5 millivolts. The meter M progressing through negative as well as positive readings, will indicate the number of reversely connected thermocouples. With all seven thermocouples reversely connected, there would be a reading of minus 7 millivolts.

False grounds as indicated in dotted lines at 29 in Fig. 3, will short out a plurality of thermocouples and will be revealed by the meter reading. Similarly, shorted thermocouples will be indicated by the meter reading.

Alternatively, the test circuit may be based on voltages created directly by the differential heating effects as between the hot and reference junctions of each of the interconnected thermocouples, as indicated in Fig. 4. Here, the switch 33 is adapted to be operated by relay 35 when switch 28a is closed, to connect the thermocouple junctions to current source C and meter M through the operation of switch 30.

Thus, when the thermocouples are to be tested, switch 28a is closed to operate switch 33 and switch 28b is operated to allow timer switch TS to energize relay coil 32 for a predetermined time interval. This will cause switch 30 to connect the current source C to the thermocouples and to directly heat the junctions thereof, through switch 33. When timer switch TS deenergizes relay 32 and switch 30 is restored to its normal condition, meter M will be immediately connected to the thermocouple junctions and will read the cumulative value algebraic sum of the voltages of the individual thermocouples created by the differential heating effect as between the exposed hot junction 13 and the insulated reference junctions 11a, 12a and augmented by the increased mass of metal elements 14, 15. Opening switch 28a restores the system to normal condition or for continuity test by thermocouple 26, as previously described.

The circuit shown in Fig. 4 eliminates one timer switch and shortens the time of the test period. Furthermore, the tested thermocouples operate in the same manner during test as they would under operating field conditions.

Figure 5:
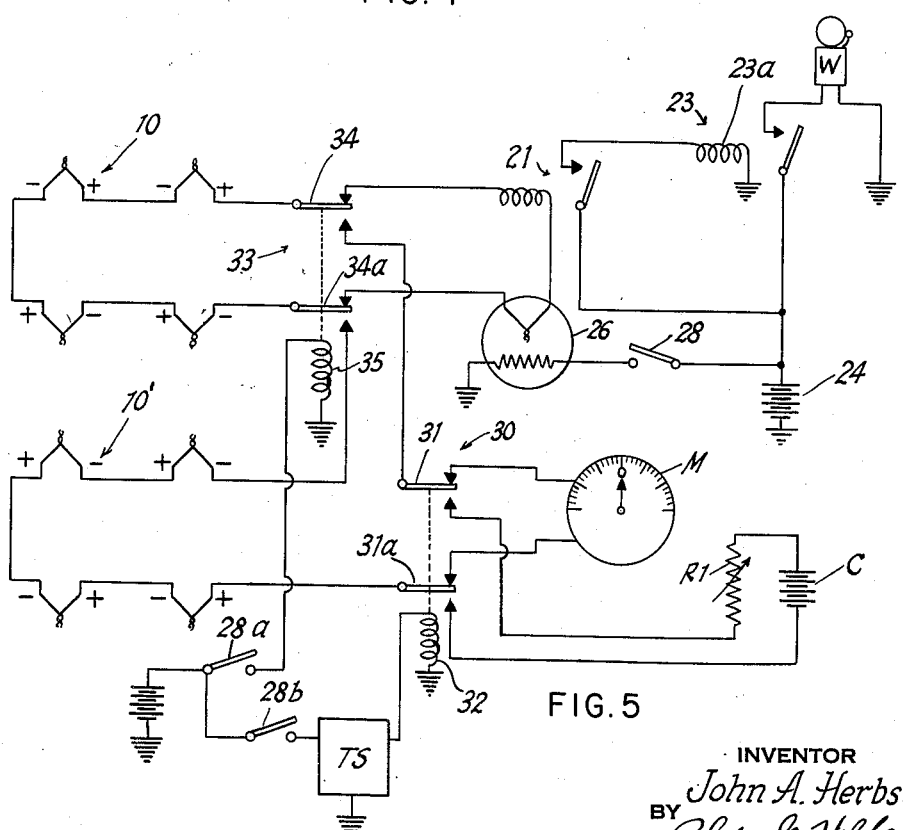

In a further modification of the invention, the cumulative value of the voltages generated by a group of thermocouples may be compared with that of a second group of thermocouples used as a test standard. Thus, as shown in Fig. 5, 10 designates the thermocouples to be tested, being indicated as four in number for the purpose of illustration. A second group of four thermocouples 10', each of which is entirely similar in design to thermocouples 10, is adapted to be connected in series with thermocouples 10, through switch 33. The meter M and current source C are adapted to be connected to the junctions of thermocouples 10, 10' through operation of switch 30, relay 32 and timer switch TS, as described in connection with Fig. 4.

It will be noted that thermocouples 10' are correctly interconnected so as to provide a voltage in a direction opposite to that of the voltage supplied by thermocouples 10. Thus, when switch 28a is closed, relay 35 is operated to shift switch 33. Switch 28b is then closed to permit timer switch TS to operate and allow current from current source C to flow through switch 30 to the junctions of both groups of thermocouples. The resultant voltage will register on meter M when timer switch TS restores switch 30 to normal. Assuming that all the thermocouples 10 are correctly connected then their total voltage will be equal and opposite to the total voltage of thermocouples 10' and the meter M will give a zero reading. However, if one or more thermocouples 10 are incorrectly connected, then a negative meter reading will indicate the number of thermocouples incorrectly connected.

Thermocouples 10', which are always identical in number and design as the thermocouples to be tested, are conveniently mounted on a test panel together with meter M, the relays and switches and accurately connected as to polarity, in order to insure a proper offset voltage with respect to the distantly located, and often substantially inaccessible thermocouples 10.

It is understood that a test set of thermocouples may also be used in the circuit of Fig. 3 wherein the voltages are created by a differential cooling effect, suitable changes in connections being made to insure that the total voltage of both sets of thermocouples is supplied to the meter M after the junctions have been heated and allowed to cool.

The timer switches TS and TS₁ are of conventional type, which are preset to allow circuits to be closed or opened over predetermined time intervals.

The current source C may be of the constant current type, using the rheostat R₁ or other suitable means to keep the current supplied to the thermocouple junctions substantially constant. In this manner, the meter M may be accurately calibrated to give a known reading for a given amount of current supplied to a given number of correctly connected thermocouples for use as an index with respect to readings taken when one or more thermocouples are incorrectly connected. This makes certain that a reading will reveal the exact number of incorrectly connected thermocouples.

The enclosed thermocouple 26 may be retained to test the continuity of the circuit connections in conjunction with the test circuits of the instant invention.

It will thus be seen that there are provided test circuits for systems of the character described, in which the several objects of the invention are achieved and which are well adapted to meet the conditions of practical use.

As various possible embodiments might be made of the above described invention, and as various changes might be made in the embodiments set forth, it is to be understood that all matter herein set forth or shown in the accompanying drawings, is to be interpreted as illustrative and not in a limiting sense.

Having thus described my invention, I claim as new and desire to protect by Letters Patent:

1. In a temperature measuring system comprising a circuit including at least one thermocouple having a hot junction and heat insulated reference junctions, test means for the circuit including a source of current of predetermined value, time controlled switch means for connecting said current source in said circuit for a predetermined time interval, a meter and time controlled switch means for connecting said meter in series with said thermocouple upon the expiration of a predetermined time interval after the expiration of the first mentioned time interval.

2. In a rapid temperature rise detection system, a predetermined number of series connected thermocouples, each thermocouple comprising a hot junction and heat insulated reference junctions, and a polarized relay in circuit with said thermocouples, a source of current of predetermined value, a relay operated switch for connecting said source of current to said thermocouples, a meter, a second relay operated switch for connecting said meter to said thermocouples, means for closing said first mentioned switch for a predetermined time interval whereby the junctions of said thermocouples are heated, and means for closing said second mentioned switch upon the expiration of a predetermined time interval after said first mentioned switch is opened whereby the total voltage produced by the differential cooling of the junctions of said thermocouples is indicated on said meter.

3. In a rapid temperature rise detection system comprising a predetermined number of series connected thermocouples, each thermocouple comprising a hot junction and a pair of reference junctions, test means for said thermocouples comprising a source of constant current, a meter, switch means for connecting the junctions of said thermocouples to said current source, said switch means being adapted to connect the junctions of said thermocouples to said meter, and means operative to control the duration of the first mentioned connection of said switch means.

4. In a rapid temperature rise detection system comprising a group of series connected thermocouples having generally proper polarity connections, each thermocouple comprising a hot junction and a pair of reference junctions, test means for said group of thermocouples comprising a source of current, a meter, a second group of series connected thermocouples equal in number to those of the first group and having each thermocouple thereof properly connected to the adjacent thermocouple as to polarity, the thermocouples of said second group being series connected to those of the first group and having the polarity connections thereof opposition to the polarity connections of the first group, and switch means for successively connecting the junctions of said groups of thermocouples to said source of current and said meter, whereby the cumulative voltages created by said first group of thermocouples may be compared with the cumulative voltages created by the second group of thermocouples by the reading on said meter.

5. Test means as in claim 4 and further including means operable to control the operation of said switch means.

6. A method of testing a plurality of interconnected thermocouples, each thermocouple comprising a hot junction and a pair of reference junctions, comprising passing a current through the junctions of said thermocouples for a predetermined time interval and measuring the algebraic sum of the voltages produced by said thermocouples upon the expiration of a second predetermined time interval after the expiration of the first time interval.

JOHN A. HERBST.

References Cited in the file of this patent
UNITED STATES PATENTS

| Number | Name | Date |
|---|---|---|
| 1,206,304 | Chubb | Nov. 28, 1916 |
| 1,818,847 | Gruss | Aug. 11, 1931 |
| 1,957,051 | Norton | May 1, 1934 |
| 2,376,920 | Jones | May 29, 1945 |
| 2,473,940 | Clark | June 21, 1949 |